United States Patent
Citron et al.

(10) Patent No.: US 8,916,664 B2
(45) Date of Patent: *Dec. 23, 2014

(54) OLEFIN POLYMERIZATION PROCESS

(75) Inventors: Joel David Citron, Wilmington, DE (US); Alex Sergey Ionkin, Kennett Square, PA (US)

(73) Assignee: E I Du Pont de Nemours and Company, Wilmington, DE (US)

( * ) Notice: Subject to any disclaimer, the term of this patent is extended or adjusted under 35 U.S.C. 154(b) by 83 days.

This patent is subject to a terminal disclaimer.

(21) Appl. No.: 13/576,741

(22) PCT Filed: Mar. 28, 2011

(86) PCT No.: PCT/US2011/030126
§ 371 (c)(1),
(2), (4) Date: Aug. 2, 2012

(87) PCT Pub. No.: WO2011/126787
PCT Pub. Date: Oct. 13, 2011

(65) Prior Publication Data
US 2012/0309916 A1    Dec. 6, 2012

Related U.S. Application Data

(60) Provisional application No. 61/318,570, filed on Mar. 29, 2010, provisional application No. 61/318,556, filed on Mar. 29, 2010, provisional application No. 61/357,368, filed on Jun. 22, 2010, provisional application No. 61/357,362, filed on Jun. 22, 2010, provisional application No. 61/362,563, filed on Jul. 8, 2010.

(51) Int. Cl.
C08F 4/80    (2006.01)
C08F 4/70    (2006.01)
C08F 110/02    (2006.01)

(52) U.S. Cl.
USPC ........... 526/172; 526/113; 526/114; 526/115; 526/169.1; 526/352; 526/78; 526/79; 526/161

(58) Field of Classification Search
USPC ............... 526/113, 114, 115, 172, 169.1, 352
See application file for complete search history.

(56) References Cited

U.S. PATENT DOCUMENTS

| | | | |
|---|---|---|---|
| 5,071,927 A | 12/1991 | Benham et al. | |
| 5,137,994 A | 8/1992 | Goode et al. | |
| 5,686,542 A | 11/1997 | Ostoja-Starzewski et al. | |
| 5,753,785 A | 5/1998 | Reddy et al. | |
| 5,856,610 A | 1/1999 | Tamura et al. | |
| 6,103,946 A | 8/2000 | Brookhart, III et al. | |
| 6,297,338 B1 | 10/2001 | Cotts et al. | |
| 6,555,631 B1 * | 4/2003 | Wang et al. | 526/113 |
| 6,586,541 B2 * | 7/2003 | Citron | 526/113 |
| 6,586,550 B2 | 7/2003 | Cotts et al. | |
| 6,620,895 B1 | 9/2003 | Cotts et al. | |

FOREIGN PATENT DOCUMENTS

WO    90/15085 A1    12/1990

OTHER PUBLICATIONS

Benham, E.A. et al., "A Process for the Simultaneous Oligomerization and Copolymerization of Ethylene", Polymer Engineering and Science, Nov. 1988, vol. 28, No. 22, pp. 1469-1472.
Benham, E., Ethylene Polymers, LDPE, in J. I. Kroschwitz, et al., Ed., Encyclopedia of Polymer Science and Technology, H. Mark, 3rd Ed., vol. 2, Wiley Interscience, (2003) pp. 382-412.
Denger, C., et al., "Simultaneous Oligomerization and Polymerization of Ethylene", Makromo. Chem. Rapid Commun., vol. 12, p. 697-701 (1991).
Maraschin, N., Ethylene Polymers, LDPE, in J. I. Kroschwitz, et al., Ed., Encyclopedia of Polymer Science and Technology H. Mark, 3rd Ed., vol. 2, Wiley Interscience, (2003) pp. 412-441.
Simpson, D.M. & Vaughan, G.A., Ethylene Polymers, LLDPE, in J.I. Kroschwitz, et al., Ed., Encyclopedia of Polymer Science and Technology, H. Mark, 3rd Ed., vol. 2, Wiley Interscience, (2003) pp. 441-482.
Bianchini, C. et al., "Simultaneous Polymerization and Shulz-Fiory Oligomerization of Ethylene Made Possible by Activation with MAO of a C1-symmetric A2,6-Bis(arylimino)pyridyluiron Dichloride Precurson", Organometallics, ACS, Washington, DC, US, vol. 23, No. 26, Dec. 20, 2004, pfa. 6087-6089, XP001235651, ISSN:0276-7333, DOI: 10.1021/0m049313j.
Bianchini, C. et al., "Ethylene Oligomerization, Homopolymerization and Copolymerization by iron and Cobalt Catalysts with 2,6-(bis-organylimino)pyridyl Ligands", Coordination Chemistry Reviews, Elsevier Science, Amsterdam, NL, vol. 250, No. 11-12, Jun. 1, 2006, p. 1391-1418 XP025166227, ISSN: 0010-8545, DOI:10-1016/J.CCR.2005.12.018 [retrieved on Jun. 1, 2006].

* cited by examiner

*Primary Examiner* — Rip A. Lee

(57) ABSTRACT

An ethylene oligomerization catalyst that oligmerizes ethylene to a series of α-olefins and that has a Schulz-Flory constant of about 0.75 to 0.995 produces a stream of α-olefins. This stream is then added to a vessel containing ethylene and a copolymerization catalyst that copolymerizes ethylene and α-olefins. The resulting branched polyethylene often has good processing properties. The good processing is presumably due to the presence of "long chain branching". Such polymers are useful for films and other packaging materials, and for molding resins for molding parts such as industrial, automotive or electrical parts.

12 Claims, No Drawings

OLEFIN POLYMERIZATION PROCESS

CROSS-REFERENCE TO RELATED APPLICATIONS

This application claims the benefit of priority of U.S. Provisional Application Nos. 61/318,556 filed on Mar. 29, 2010; 61/318,570 filed on Mar. 29, 2010; 61/362,563 filed on Jul. 8, 2010; 61/357,362 filed on Jun. 22, 2010 and 61/357,368 filed on Jun. 22, 2010 which are herein incorporated by reference in their entirety.

FIELD OF THE INVENTION

A polymerization to form a branched polyolefin, in which an ethylene oligomerization catalyst forms a series of ethylene oligomers that are α-olefins, and then these α-olefins are contacted in a liquid medium with ethylene and a copolymerization catalyst that copolymerizes ethylene and the α-olefins, gives an improved polyethylene if the oligomerization catalyst has a relatively high Schulz-Flory constant ("SFC").

BACKGROUND OF THE INVENTION

Polymerization of olefins, especially ethylene, to form polyolefins is an important commercial process, literally millions of tons of such polymers being produced annually. Among the useful grades of polyethylene is Low Density Polyethylene (LDPE), which is usually made by a high pressure process that yields a polyethylene that has excellent processability, see for instance N Maraschin, *Ethylene Polymers, LDPE*, in J. I. Kroschwitz, et al., Ed., *Encyclopedia of Polymer Science and Technology*, H. Mark, 3rd Ed., Vol. 2, Wiley Interscience, (2003) p. 412-441, which is hereby included by reference. Such LDPE usually has short chain branching, and is also believed to have long chain branching (LCB), although the lengths of these long chains is not known. It is believed that the good processability of LDPE is due to the presence of these long chain branches.

There are other grades of polyethylenes that, while not usually having LCBs, are also useful. Although they generally do not process as well as LDPE, they have other superior properties that render them useful. Such grades of polyethylene (PE) include Linear Low Density Polyethylene (LLDPE), which has short chain branches, see for instance D. M. Simpson & G. A. Vaughan, *Ethylene Polymers, LLDPE*, in J. I. Kroschwitz, et al., Ed., *Encyclopedia of Polymer Science and Technology*, H. Mark, $3^{rd}$ Ed., Vol. 2, Wiley Interscience, (2003) p. 441-482 (this reference also has a good comparison and description to the properties of LOPE), which reference is hereby included by reference, and High Density Polyethylene (HDPE), which may be linear or have a small amount of short chain branches, see for instance E. Benham, *Ethylene Polymers, LDPE*, in J. I. Kroschwitz, et al., Ed., *Encyclopedia of Polymer Science and Technology*, H. Mark, $3^{rd}$ Ed., Vol. 2, Wiley Interscience, (2003) p. 382-412, which is hereby included by reference.

It has been a longstanding goal to produce other PEs, such as HDPE or LLDPE, that process similarly to or better than LDPE, while retaining the other superior physical properties possessed by these PEs.

U.S. Pat. No. 6,297,338, which is hereby included by reference, describes a process in which an ethylene copolymerization catalyst is combined with an ethylene oligomerization catalyst that produces α-olefins to produce branched PE similar to LLDPE. No specific mention is made of using an oligomerization catalyst with a high SFC, nor is it stated that the processability of such a polyolefin can be improved by use of such an oligomerization catalyst.

U.S. Pat. No. 6,586,550 describes PEs made by the process of U.S. Pat. No. 6,297,338. The PEs described in this patent were not made using oligomerization catalysts with high SFCs.

U.S. Pat. No. 6,103,946 describes the production of α-olefins using iron complexes of certain diimines of 2,6-diacylpyridines or 2,6-pyridinedicarboxaldehydes. Nothing is said of using the resulting α-olefins in situ to produce a copolymer.

Other references that report simultaneous oligomerization and polymerization of various olefins are World Patent Application 90/15085, U.S. Pat. Nos. 5,753,785, 5,856,610, 5,686, 542, 5,137,994, and 5,071,927, C. Denger, et al., Makromol. Chem. Rapid Commun., vol, 12, p. 697-701 (1991), and E. A. Benham, et al., Polymer Engineering and Science, vol. 28, p. 1469-1472 (1988). None of these describe using oligomerization catalysts with high SFCs.

SUMMARY OF THE INVENTION

This invention concerns, a process for the manufacture of a branched polyethylene, comprising, contacting ethylene with an ethylene oligomerization catalyst that produces a series of α-olefins, and then after said series of α-olefins is formed contacting in a liquid medium said series of α-olefins with a copolymerization catalyst and ethylene to form a branched polyethylene, wherein said oligomerization catalyst that produces said series of α-olefins has a SFC of about 0.75 to 0.995 under oligomerization process conditions.

Other features and advantages of the present invention will be better understood by reference to the detailed description and examples that follow.

DETAILED DESCRIPTION OF THE INVENTION

In this description certain terms are used and some of them are defined below.

A "hydrocarbyl group" is a univalent group containing only carbon and hydrogen. As examples of hydrocarbyls may be mentioned unsubstituted alkyls, cycloalkyls and aryls. If not otherwise stated, it is preferred that hydrocarbyl groups (and alkyl groups) herein contain 1 to about 30 carbon atoms.

By "substituted hydrocarbyl" herein is meant a hydrocarbyl group that contains one or more substituent groups that are inert under the process conditions to which the compound containing these groups is subjected (e.g., an inert functional group, see below). The substituent groups also do not substantially detrimentally interfere with the polymerization process or operation of the polymerization catalyst system. If not otherwise stated, it is preferred that (substituted) hydrocarbyl groups herein contain 1 to about 30 carbon atoms. Included in the meaning of "substituted" are rings containing one or more heteroatoms, such as nitrogen, oxygen and/or sulfur, and the free valence of the substituted hydrocarbyl may be to the heteroatom. In a substituted hydrocarbyl, all of the hydrogens may be substituted, as in trifluoromethyl.

By "(inert) functional group" herein is meant a group, other than hydrocarbyl or substituted hydrocarbyl, that is inert under the process conditions to which the compound containing the group is subjected. The functional groups also do not substantially deleteriously interfere with any process described herein that the compound in which they are present may take part in. Examples of functional groups include halo (fluoro, chloro, bromo and iodo), and ether such as $—OR^{50}$ wherein $R^{50}$ is hydrocarbyl or substituted hydrocarbyl. In cases in which the functional group may be near a transition metal atom, the functional group alone should not coordinate to the metal atom more strongly than the groups in those compounds that are shown as coordinating to the metal atom, i.e., they should not displace the desired coordinating group.

By a "cocatalyst" or a "catalyst activator" is meant one or more compounds that react with a transition metal compound to form an activated catalyst species. One such catalyst activator is an "alkylaluminum compound" which, herein, means a compound in which at least one alkyl group is bound to an aluminum atom. Other groups such as, for example, alkoxide, hydride, an oxygen atom bridging two aluminum atoms, and halogen may also be bound to aluminum atoms in the compound.

By an "α-olefin" is meant a composition predominantly comprising a compound or mixture of compounds of the formula $H(CH_2CH_2)qCH=CH_2$ wherein q is an integer of 1 or more. The product may further contain small amounts (preferably less than 30 weight percent, more preferably less than 10 weight percent, and especially preferably less than 2 weight percent) of other types of compounds such as alkanes, branched alkenes, dienes and/or internal olefins.

By a "series" of α-olefins is meant compounds having the formula $H(CH_2CH_2)qCH=CH_2$ wherein at least three compounds, more preferably at least 5 compounds, having different values of q are produced.

By "aryl" is meant a monovalent aromatic group in which the free valence is to the carbon atom of an aromatic ring. An aryl may have one or more aromatic rings, which may be fused, connected by single bonds or other groups.

By "substituted aryl" is meant a monovalent aromatic group substituted that contains one or more substituent groups that are inert under the process conditions to which the compound containing these groups is subjected (e.g., an inert functional group, see below). The substituent groups also do not substantially detrimentally interfere with the polymerization process or operation of the polymerization catalyst system. If not otherwise stated, it is preferred that (substituted) aryl groups herein contain 1 to about 30 carbon atoms. Included in the meaning of "substituted" are rings containing one or more heteroatoms, such as nitrogen, oxygen and/or sulfur, and the free valence of the substituted hydrocarbyl may be to the heteroatom. In a substituted aryl, all of the hydrogens may be substituted, as in trifluoromethyl. These substituents include (inert) functional groups. Similar to an aryl, a substituted aryl may have one or more aromatic rings, which may be fused, connected by single bonds or other groups; however, when the substituted aryl has a heteroaromatic ring, the free valence in the substituted aryl group can be to a heteroatom (such as nitrogen) of the heteroaromatic ring instead of a carbon.

By "process conditions" herein is meant conditions for forming the series of α-olefins using the oligomerization catalyst, or the conditions for forming the branched polyethylene using the copolymerization catalyst, as the case may be. Such conditions may include temperature, pressure, oligomerization method such as liquid phase, continuous, batch, and the like. Also included may be cocatalysts that are needed and/or desirable.

The "Schulz-Flory constant" ("SFC") of the mixtures of α-olefins produced is a measure of the molecular weights of the olefins obtained, usually denoted as factor K, from the Schulz-Flory theory (see for instance B. Elvers, et al., Ed. Ullmann's Encyclopedia of Industrial Chemistry, Vol. A13, VCH Verlagsgesellschaft mbH, Weinheim, 1989, p. 243-247 and 275-276, which is hereby included by reference). This is defined as:

$$K=n(C_{n+2}\text{ olefin})/n(C_n\text{ olefin})$$

wherein $n(C_n$ olefin) is the number of moles of olefin containing n carbon atoms, and $n(C_{n+2}$ olefin) is the number of moles of olefin containing n+2 carbon atoms, or in other words the next higher oligomer of $C_n$ olefin. From this can be determined the weight (mass) and/or mole fractions of the various olefins in the resulting oligomeric reaction product mixture.

By a "copolymerization catalyst" is meant a catalyst that can readily, under the process conditions, copolymerize ethylene and α-olefins of the formula $H(CH_2CH_2)qCH=CH_2$ wherein q is an integer of 1 or more. Preferably the copolymerization catalyst produces a polyolefin that has a weight average molecular weight of about 5,000 or more, more preferably 10,000 or more, and very preferably 20,000 or more, the weight average molecular weight being measured by Size Exclusion Chromatography, using a linear polyethylene as a standard.

By an "oligomerization catalyst" is meant a catalyst (system) capable of oligomerizing ethylene to a series of α-olefins.

Many types of catalysts are useful as the copolymerization catalyst. For instance so-called Ziegler-Natta and/or metallocene-type and/or chromium catalysts may be used. These types of catalysts are well known in the polyolefin field, see for instance Angew. Chem., Int. Ed. Engl., vol. 34, p. 1143-1170 (1995), EP-A-0416815 and U.S. Pat. No. 5,198,401 for information about metallocene-type catalysts; and J. Boor Jr., Ziegler-Natta Catalysts and Polymerizations, Academic Press, New York, 1979 for information about Ziegler-Natta type catalysts, all of which are hereby included by reference. Many of the useful polymerization conditions for these types of catalysts and the oligornerization catalyst coincide, so conditions for the process are easily accessible. Often a "cocatalyst" or "activator" is needed for metallocene or Ziegler-Natta type polymerizations, which are oftentimes the same as are sometimes needed for the oligomerization catalyst. In many instances cocatalysts or other compounds, such as an alkylaluminum compound, may be used with both types of catalysts.

Chromium catalysts are also well known, see for instance E. Benham, et al., Ethylene Polymers, HDPE in Encyclopedia of Polymer Science and Technology (online), John Wiley & Sons, and D. M. 5 Simpson, et al., Ethylene Polymers, LLDPE, in Encyclopedia of Polymer Science and Technology (online), John Wiley & Sons, both of which are hereby included by reference.

Suitable catalysts for the copolymerization catalyst also include metallocene-type catalysts, as described in U.S. Pat. No. 5,324,800 and EP-A-0129368; particularly advantageous are bridged bis-indenyl metallocenes, for instance as described in U.S. Pat. No. 5,145,819 and EP-A-0485823. Another class of suitable catalysts comprises the well known constrained geometry catalysts, as described in EP-A-0416815, EP-A-0420436, EP-A-0671404, EP-A-0643066 W091104257. Also the class of transition metal complexes described in, for example, W098130609, U.S. Pat. Nos. 5,880,241, 5,955,555, 6,060,569 and 5,714,556 can be used. All of the aforementioned publications are incorporated by reference herein. Metallocene-type catalysts are most preferred, and preferred metallocene catalysts are those listed in previously incorporated World Patent Application 1999/150318, which is hereby included by reference.

It is to be understood that "oliogomerization catalyst" and "copolymerization catalyst" also include other compounds such as cocatalysts and/or other compounds normally used with the oliogomerization catalyst and/or copolymerization catalyst to render that particular catalyst active for the polymerization or oligomerization it is meant to carry out.

A preferred oligomerization catalyst is an iron complex of a ligand of the formula:

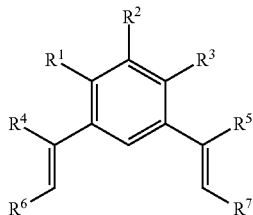
(I)

wherein: $R^1$, $R^2$ and $R^3$ are each independently hydrogen, hydrocarbyl, substituted hydrocarbyl or an inert functional group, provided that any two of $R^1$, $R^2$ and $R^3$ vicinal to one another taken together may form a ring; $R^4$ and $R^5$ are each independently hydrogen, hydrocarbyl, substituted hydrocarbyl or an inert functional group provided that $R^1$ and $R^4$ and/or $R^3$ and $R^5$ taken together may form a ring; and $R^6$ and $R^7$ are each independently aryl or substituted aryl. In another preferred form of (I) $R^1$ and $R^4$ taken together form a ring, and/or $R^3$ and $R^5$ taken together may form a ring, see U.S. Pat. No. 7,442,819.

In an iron complex of (I), (I) is usually thought of as a tridentate ligand coordinated to the iron atom through the two imine nitrogen atoms and the nitrogen atom of a pyridine ring. It is generally thought that the more sterically crowded it is about the iron atom the higher the molecular weight of the polymerized olefin (ethylene). In order to make α-olefins, and especially to make them in a process wherein the SFC is relatively high (such as 0.75 to 0.995), increased steric crowding about the iron atom is desired, when compared to oligomerization catalysts having lower SFCs [for oligomerization catalysts having lower SFCs see U.S. Pat. No. 6,103,946, World Patent Application 2005/092821, and G. J. P. Britovsek et al., *Chem. Eur. J.*, vol, 6 (No. 12), p. 2221-2231 (2000)].

The synthesis of the ligands (I) and their iron complexes are well known, see for instance U.S. Pat. No. 6,103,946, G. J. P. Britovsek, et al., cited above, and World Patent Application WO2005/092821, and also the Examples herein.

Other relatively small aryl groups may also be used, such as 1-pyrrolyl, made from substituted or unsubstituted 1-aminopyrrole (see for instance World Patent Application 2006/0178490, which is hereby included by reference). Analogous substitution patterns to those carried out in phenyl rings may also be used to attain the desired degree of steric hindrance, and hence the desired SFC. Aryl groups containing 5-membered rings such as 1-pyrrolyl may be especially useful for obtaining the desired SFCs, since they are generally less sterically crowding than 6-membered rings. Preferred aryl groups for $R^6$ and $R^7$ are phenyl and substituted phenyl.

In an especially preferred class of such ligands (I), and specifically (IV), $R^6$ is (II) and $R^7$ is (III),

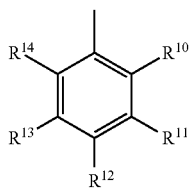
(II)

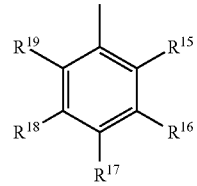
(III)

wherein $R^{10}$, $R^{14}$, and $R^{15}$ are each independently hydrocarbyl, substituted hydrocarbyl or a functional group other than fluoro, and $R^{11}$ to $R^{13}$ and $R^{16}$ to $R^{18}$ are each independently hydrogen hydrocarbyl, substituted hydrocarbyl or a functional group, and $R^{19}$ is hydrogen or fluoro, and any two of $R^{10}$ through $R^{19}$ vicinal to one another may form a ring. More preferably, in (IV) and its iron complexes, $R^{10}$, $R^{14}$ and $R^{15}$ are each independently alkyl containing 1 to 12 carbon atoms, and/or $R^{11}$ to $R^{13}$ and $R^{16}$ to $R^{18}$ are each independently hydrogen or alkyl containing 1 to 12 carbon atoms, and/or $R^1$, $R^2$, and $R^3$ are hydrogen, and/or $R^4$ and $R^5$ are both methyl or hydrogen. The iron complexes of (I) and (IV) contain only one of the ligands (I) or (IV), respectively, per iron atom present. In an especially preferred form of (IV), at least one of $R^{10}$, $R^{14}$ and $R^{15}$ is a secondary carbon group and/or a tertiary carbon group. By "and/or" in this instance is meant that one or more of $R^{10}$, $R^{14}$ and $R^{15}$ may be secondary carbon group and one or more of the same groups not secondary carbon groups may be tertiary carbon groups. For synthesis of (IV) see the Examples herein, and B. L. Small and M. Brookhart, *Macromolecules*, 1999, vol. 32, p. 2120-2130 (and supporting information), which is hereby included by reference. Groups in the meta- and para-positions of (II) and (III) may also have some effect upon the SFC, but usually not as much as ortho-groups.

By a primary carbon group is meant the group

wherein the solid line represents the bond to the aryl group, and the free bond represented by the dashed line is to another atom. Examples of primary carbon groups are methyl, ethyl, chloromethyl, methoxymethyl, etc.

By a secondary carbon group is meant the group

wherein the solid line represents the bond to the aryl group, and both free bonds represented by the dashed lines are to an atom or atoms other than hydrogen. These atoms or groups may be the same or different. In other words the free valences represented by the dashed lines may be hydrocarbyl, substituted hydrocarbyl or functional groups. Examples of secondary carbon groups include —CH(CH$_3$)$_2$, —CHCl$_2$, —CH(C$_6$H$_5$)$_2$, cyclohexyl, —CH(CH$_3$)OCH$_3$, and —CH═CCH$_3$.

By a "tertiary carbon group" is meant a group of the formula

wherein the solid line is the bond to the aryl group and the three free bonds represented by the dashed lines are to an atom or atoms other than hydrogen. In other words, the bonds represented by the dashed lines are to hydrocarbyl, substituted hydrocarbyl, or inert functional groups. Examples of tetiary carbon groups include —C(CH$_3$)$_3$, —C(C$_6$H$_5$)$_3$, —CCl$_3$, —C(CH$_3$)$_2$OCH$_3$, —C≡CH, —C(CH$_3$)$_2$CH═CH$_2$, and 1-adamantyl.

The steric effect of various groups, such as alkyl groups and other groups, is well know, see for instance R. W. Taft Jr., *J. Am. Chem. Soc.*, vol. 74, p. 3120-3128 (1952), S. H. Unger, et al., *Progress in Physical Organic Chemistry*, R. W. Taft, Ed, Vol. 12, John Wiley & Sons, Inc, New York, 1976, p. 91-101, and *Steric Effects in Organic Chemistry*, M. S. Newman, Ed., John Wiley & Sons, New York, 1956, p. 597-603, all of which are hereby included by reference. In the case of (I) wherein (II) and (III) are also present, one need only choose groups according to their steric hindrance based on these and other similar publications in order to produce more or less steric hindrance in ligand and hence in the resulting iron complex.

While steric hindrance about the iron atom is usually the dominant item controlling the SFC, process conditions may have a lesser effect. Higher process temperatures generally give lower SFOs, while higher ethylene pressures (concentrations) generally give higher SFCs, all other conditions being equal.

The SFC of the oligomerization catalyst is in the range of about 0.75 to 0.995. A preferred minimum SFC is 0.80, more preferably 0.85, especially preferably 0.90, very preferably 0.95 and very especially preferably 0.98. A preferred maximum SFC is 0.98, more preferably 0.95, especially preferably 0.90, and very preferably 0.35. It is to be understood that any minimum preferred SFC can be combined with any maximum preferred SFC to form a preferred SFC range (including the minimum and maximum of the overall range).

It is preferred that the PE of the present invention have superior processability, and this is achieved presumably by having "long chain" branching. It is really not known how long the branches have to be in order to materially improve processability, but generally is believed that branches containing 50 to 100 carbon or more are effective. Thus the oligomerization catalyst should produce significant amounts of α-olefins, which when copolymerized produce branch lengths in the desired range of 50-100 or more carbons. In other words, α-olefins containing 50-100 carbon atoms or more should be produced in significant amounts. Table 1 shows the relationship between SFCs and the amounts of α-olefins produced in certain ranges of carbon atom content.

TABLE 1

| | SF Constant | | | | | | |
|---|---|---|---|---|---|---|---|
| | 0.65 | 0.75 | 0.85 | 0.95 | 0.98 | 0.99 | 0.995 |
| Mole percent | | | | | | | |
| C50-C100 | 0.00 | 0.13 | 2.35 | 22.65 | 25.84 | 19.88 | 15.27 |
| C50-C200 | 0.00 | 0.13 | 2.38 | 30.13 | 49.63 | 46.17 | 39.59 |

TABLE 1-continued

| | SF Constant | | | | | | |
|---|---|---|---|---|---|---|---|
| | 0.65 | 0.75 | 0.85 | 0.95 | 0.98 | 0.99 | 0.995 |
| C50-C300 | 0.00 | 0.13 | 2.38 | 30.70 | 58.29 | 62.08 | 58.53 |
| C50-C400 | 0.00 | 0.13 | 2.38 | 30.70 | 61.44 | 71.70 | 73.26 |
| C50-C500 | 0.00 | 0.13 | 2.38 | 30.70 | 62.59 | 77.52 | 84.87 |
| C100-C200 | 0.00 | 0.00 | 0.04 | 7.91 | 24.55 | 26.91 | 24.87 |
| Weight Percent | | | | | | | |
| C4-C50 | 99.98 | 99.56 | 92.95 | 40.48 | 10.94 | 4.34 | 2.36 |
| C4-C100 | 100.00 | 100.00 | 99.79 | 74.91 | 29.59 | 13.63 | 8.03 |

These calculations are fairly exact, using the equation given for the SFC above and other standard stoichiometric calculations. The calculations for SFCs of 0.65 to 0.85 were made out to olefins containing 200 carbon atoms, for an SFC 0.95 olefins out to 300 carbons were calculated, and for SFCs of more than 0.95 calculations were made out to 500 carbon olefins. As can be seen for a SFC of 0.65, little or no olefin containing 50 carbon atoms or more is produced. Starting at a SFC of about 0.75, significant amounts of C50 or higher olefins are produced, and this increases as the SFC increases. For a SFC; of 0.65 the α-olefins produced have relatively low molecular weight and basically a LLDPE-like polymer is produced. This is what is shown in, for instance, U.S. Pat. No. 6,586,550. As the SFC is raised proportionately lesser and lesser amounts of lower α-olefins are produced (under otherwise the same process conditions), and the amount of higher α-olefins increases.

Thus if one wants to make a PE containing relatively few short branches (for example a HDPE-like polymer) but with some long chain branching to presumably improve processability, then small amounts (relative to the copolymerization catalyst) of a copolymerization catalyst having a very high SFC, say 0.90 to 0.995, more preferably 0.95 to 0.995, would be used. Since it is believed only relatively small amounts of long chain branching improve processability, only a small amount of the oligomerization catalyst is needed. In this scenario, depending on copolymerization catalysts and oligomerization catalysts used, and the amount of types and branches desired, the molar ratio of copolymerization catalyst to oligomerization may typically be from about 10:1 to about 5000:1, more preferably about 20:1 to about 1000:1

Conversely, if one wants to produce a PE containing a air number of short chain branches, in other words a LLDPE-like PE, one could use an oliogomerization catalyst with an SFC of, say, about 0.75 to about 0.85, perhaps in somewhat higher amounts to achieve the short chain branching desired, while also obtaining long chain branching in the PE. These general statements assume, to some extent, that the reactivity of the α-olefins of various molecular weights that are produced by the oligomerization catalyst are roughly the same (on a molar basis) as those produced with the copolymerization catalyst. For any particular process system this may be checked by routine experimentation.

The amount of branching may be controlled by the relative amounts of α-olefins made by the oligomerization catalyst and the copolymerization catalyst that are present in the copolymerization step. The higher the relative amount of α-olefins present, the greater the degree of branching in the resulting polyethylene.

The α-olefin stream from the oligomerization part of the process may be treated in several ways to enhance its utility in the process. The oligomerization catalyst may be deactivated in a normal fashion by adding, for instance, a hydroxyl-containing compound such as water or an alcohol. The solvent, particularly if it is volatile, may be partially or completely removed by applying a vacuum or simply distilling it out. If this is done, it is likely to also remove volatile α-olefins such as 1-butene and 1-hexene that may be in the α-olefin stream. The more volatile α-olefins may also be removed by volatilization even if the solvent itself is not very volatile. In another preferred form of the invention, the α-olefins so made are fed into the polymerization process in approximately the same molar ratios in which they were produced. In another preferred form, all of the α-olefins produced, with the exception of 1-butuene and 1-hexene are fed into the polymerization reactor in approximately the molar ratios in which they were produced. Removal of volatile α-olefins is permitted, perhaps even preferred, so long as the α-olefins entering the polymerization reactor are a "series of α-olefins" as defined above. A reason it may be preferred to remove volatile (lower molecular weight) α-olefins is that if longer polymer branches are desired to improve polymer processability, while decreasing the polyethylene density as little as possible, removal of lower α-olefins is beneficial.

The present oligomerization step is most conveniently done in solution, since many of the α-olefins are themselves liquid at process temperatures. The copolymerization must be done in solution or as a slurry (suspension) polymerization since a substantial percentage of the α-olefins produced are relatively nonvolatile liquids, so they are not suitable for use in a gas phase process.

Solution and slurry (suspension) polymerizations of these types are well known, see for instance Y. V. Kissin, *Polyethylene, Linear Low Density*, Kirk-Othmer Encyclopedia of Chemical Technology (online), John Wiley & Sons, DOI 10.1002/0471238961.10209149511091919.a01.pub2 (2005), which is hereby included by reference for the polymerization. These polymerization process types may be carried out either continuously, batch, or semibatch. Useful types of reactors include continuous stirred tank reactors and loop reactors.

For the oligomerization process conditions see U.S. Pat. Nos. 6,103,946, 6,534,691, 7,053,259, 7,049,442, and 7,053,020, World Patent Applications 1999/012981 and 2000/050470, and G. J. P. Britovsek, et al., cited above, all of which are hereby included by reference. Even though these references use oligomerization catalysts with relatively low SFCs, the process of oligomerization is similar for catalysts having higher SFCs. Useful process conditions for copolymerization catalysts such as metallocene catalysts, Ziegler-Natta catalysts, and chromium catalysts are well known in the art.

In typical commercial processes for making PE, the polymerization catalyst is often supported on a particulate material (a "support"). Typical supports are silica, alumina, clay, and inorganic salts such as $MgCl_2$. In the present the process the copolymerization catalyst may be similarly supported.

Besides the copolymerization catalyst being present in the copolymerization step, other "types" of catalysts and/or other compounds may also be present in the polymerization step. For instance, a catalyst is that readily homopolymerizes ethylene but does not readily copolymerize α-olefins may be present so that the polymeric product is a blend of a branched polyethylene and an essentially unbranched polyethylene. Such a process is described in U.S. Pat. No. 6,555,631, which is hereby included by reference. By a catalyst that homopolymerizes ethylene but does not readily copolymerize ethylene and α-olefins is meant a catalyst that under process conditions copolymerizes 10 mole percent or less, more preferably 5 mole percent or less, of the amount of α-olefins copolymerized by the copolymerization catalyst present. This may be readily determined by running the process with just the copolymerization catalyst or the catalyst that does not copolymerize α-olefins readily, each in the presence of the oligomerization catalyst, and comparing the branching levels of the polyethylenes produced. Another catalyst that may be present is another copolymerization catalyst, that may, for instance, give a different molecular weight branched polyethylene as a product. Thus a product containing branched polyethylene with a broad molecular weight distribution may be obtained, Other combinations will be evident to the artisan. Other types of compounds that may also be present are lower α-olefins (containing about 4 to about 14 carbon atoms) and/or other olefins that may be copolymerized by the copolymerization catalyst. Thus if it is desired to make an LLDPE-type polymer it can be done by using an oligomerization catalyst with a very high SFC from which the resulting α-olefins are used in the copolymerization process, and that consequently does not produce much lower α-olefins, and "supplement" the amount of shorter branches which are obtained by adding one or more lower α-olefins.

The branched PE produced by the present process usually has branches of the formula —$CH_2CH_2(CH_2CH_2)_qH$, wherein q is an integer. The branching levels, defined as the number of methyl groups per 1,000 methylene groups in the polyolefin, may range from about 0.5 to about 150. Branching levels may be readily measured by NMR spectroscopy, see for instance World Patent Application 1996/023010. The densities of these branched polyolefins may range from about 0.85 to about 0.96 g/cc, depending on the branching level. The polymers may range from elastomers, to plastomers, to LLDPE, to medium density polyethylene, to essentially high density polyethylene, these being ordered from high to low branching levels. A potential difference between the structure of these PEs and previous PEs is that these PEs contain long chain branches (say containing 50 or more carbon atoms) derived from the higher α-olefins produced by the oligomerization catalyst. Unfortunately to Applicants' knowledge the length, and to some extent the amount, of branches containing more than about 10 carbon atoms can't be readily determined, and long chain branching is usually inferred from the PE's properties, for example the viscoelastic properties. Another difference between these PEs and LDPE is that LDPE contains especially short chain branches in which the branches have and odd number of carbon atoms, as a non-limiting example branches such as n-propyl and n-amyl (n-pentyl). The PEs of the present invention preferably do not contain branches having an odd number of carbon atoms unless an olefin containing an odd number of carbon atoms such as propylene or 1-pentene is added to the polymerization process. In another preferred form, the amount of methyl branches (not including end groups) is less than about 2.0 per 1,000 methylene groups, more preferably less than about 1.0 and very preferably less than about 0.5, and/or the amount of n-propyl branches is less than about 2.0 per 1,000 methylene groups, more preferably less than about 1.0 and very preferably less than about 0.5, and/or the amount of n-amyl branches is less than about 2.0 per 1,000 methylene groups, more preferably less than about 1.0 and very preferably less than about 0.5, Since it is difficult to measure long chain branching directly (see above), its presence is usually inferred by the resulting polyolefin's properties, in particular its rheological properties. The desirability of having long chain branching is described in U.S. Pat. No. 6,420,507, which is hereby included by reference, One rheological property which differs from polyolefins containing few or no long chain branches is that the polymer melt viscosity is more dependent of the shear rate at which that viscosity is measured. Sometimes this is referred to a "shear thinning", that is the apparent viscosity decreases as the shear rate is increased. While this happens to most polyolefins, it is often more pronounced in polyolefins that are believed to have long chain branching. One method of measuring this is using so-called "melt index ratio method." The melt index is a test (ASTM D1238-04c) in which molten polyolefin is forced through an orifice by the force of a certain weight on a piston. The greater the weight, the higher the shear rate on the polyolefin. One runs the test using two different weights, for instance the "standard" 2.16 kg, and 21 kg, and uses the ratio of $I_{21}/I_2$ (ratio of melt index at 21 kg divided by the melt index at 2.16 kg) or sometimes for instance $I_{10}/I_2$. The larger the ratio, the more shear thinning that occurs, and, presumably, the better the processability of the polyolefin. These methods are illustrated in U.S. Pat. Nos. 7,153,909 and 7,560,524, both of which are hereby included by reference.

Another method for measuring such rheological differences is illustrated in U.S. Pat. No. 6,586,550, which is hereby included by reference. The homopolyethylenes of this patent also have unusual properties, which gives them much better processability in processes in which high low shear viscosity and/or low high shear viscose is desirable. For instance, some of the polymers produced by the polymerization herein have unusual rheological properties that make them suitable for the uses described herein. Using the data shown in FIG. 1 of that patent, one can calculate certain indices which reflect the improved processing properties. A structural index, $S_T$, which is defined as $$S_T = \eta_0/(8.33 \times 10^{-14})(M_w)^{3.4}$$

wherein $\eta_0$ is the zero shear viscosity at 140° C. and $M_w$ is the weight average molecular weight of the polymer. Materials that have a large proportion of carbon atoms in long chain branches as opposed to short chain branches will often have a relatively high $S_T$. Preferably the polymer made herein have an $S_T$ of about 1.4 or more, more preferably about 2.0 or more.

Another index described in U.S. Pat. No. 6,586,550 which may be used to measure the potential good processability of a polymer, based on its rheological properties, is $P_R$, the Processability Index. This is a shear thinning index, and is defined as $$P_R = (\eta^* \text{ at } 0.00628 \text{ rad/s})/(\eta^* \text{ at } 188 \text{ rad/s})$$

wherein $\eta^*$ is the viscosity at the indicated rate of the viscometer. This is similar to other ratios of viscosities at different shear levels, but covers a broader range of shears. The higher the value of $P_R$, the greater the shear thinning of the polymer. It is preferred that $P_R$ of the polymers used herein be about 40 or more, more preferably about 50 or more, and especially preferably about 100 or more. Furthermore, any combination of $S_T$ and $P_R$ values mentioned herein are also preferred.

Polymers having the $S_T$ and/or $P_R$ values described above may also have relatively high densities compared to similar previously made polymers. This may be so especially if oligomerization catalyst having a relatively high SFC is used, since proportionately fewer lower α-olefins are made and incorporated into the PE. Thus the density of the PE may be 0.930 or more, more preferably 0.935 or more, very preferably 0.940 or more and especially preferably 0.945 or more. Density is measured by the method described in U.S. Pat. No. 6,586,550 at column 29, lines 13-25. A preferred upper density is about 0.98.

Another property of the polymers having the $S_T$ and/or $P_R$ values described above is the ratio of hexyl and longer branches (hex+) to n-butyl (Bu) and/or ethyl (Et) branches. It is to be noted that Hex+ includes ends of chains, while n-butyl and ethyl branches do not include ends of chains. These limits are preferably applicable to PEs having a number average molecular weight (determined by Size Exclusion Chromatography as described above) of about 15,000 or more, preferably 20,000 or more. Thus it is preferred that Hex+/Bu ratio is about 4.0 or more, more preferably about 6.0 or more and very preferably about 8.0 or more. It is also preferred that the Hex+/Et is about 4.0 or more, more preferably about 6.0 or more, and very preferably about 8.0 or more. These trends towards higher ratios of Hex+ to n-butyl and/or ethyl branches will be even more pronounced if the more volatile 1-butene and 1-hexene produced in the oligomerization step are partially or fully stripped from the α-olefin stream entering the copolymerization vessel. Branching levels may be measured by $^{13}C$ nmr as described in World Patent Application 96/23010, which is hereby included by reference. It is to be understood that any of these preferred structural features, densities, and/or rheological properties ($S_T$ and/or $P_R$) may be combined to form a preferred set of properties for a PE.

As described in U.S. Pat. No. 6,586,550, another way of finding polymers that may have good rheology (and possibly long chain branching) is by measuring the Mw versus the intrinsic viscosity. Polymers with good processing characteristics will have a lower intrinsic viscosity for a given Mw versus a (possibly more linear) worse processing polymer. This is shown in FIG. 2, of U.S. Pat. No. 6,586,550 and further explained therein.

An important part of this process, and in processes in which olefins are added (as opposed to being produced in situ), is the removal of unpolymerized α-olefins, such as 1-hexene and/or 1-octene, from the polymeric product. When using an oligomerization catalyst with a very high SFC, relatively small amounts of lower, relatively volatile, α-olefins are produced. Thus, methods used to remove olefins such as 1-hexene and 1-octene, as used for instance, in processes to make LLDPE, are applicable to the present process. In gas phase processes these olefins may be removed in the resin degassing step. For solution processes, they may be removed in the extruder, which removes solvent. In slurry processes they may be removed in the flasher and dryer. In addition, final "traces" of these olefins may be removed in any of these processes in the extruder (which usually feeds a pelletizer at the end of the production line) by adding vacuum ports to that extruder. If a high SFC oligomerization catalyst is used, there may be some unreacted higher α-olefins in the PE product. Sometimes these are called PE waxes, and may be deleterious to product properties. There are methods for "dewaxing" PE polymers, but as noted above, in such a process only small amounts of such higher α-olefins need be produced to improve processability, so dewaxing may not be needed.

The unpolymerized α-olefins that are removed from the polymer stream may be purified and recycled back into the polymerization, and/or used other processes, and/or sold, and/or burned. For recycle the recovered α-olefins may be separated into "pure" compounds or returned to the polymerization as a mixture of α-olefins.

The polyolefins produced by this process are useful (depending on their branching level) as molding resins for containers, mechanical parts, and other uses, packaging films, electrical insulation, adhesives, elastomers, rigid, or flexible foams, etc.

In order to measure the SFC of the oligomerization catalyst during the manufacture of the branched polyethylene, the α-olefin stream is sampled before going into the copolymerization and before any α-olefins are removed from that stream. For an oligomerization catalyst of the present invention with a relatively low SFC, say 0.75 to about 0.90, the resulting mixture of α-olefins (before any α-olefins are removed from the mixture) is analyzed to determine their molecular ratios, and this is most conveniently done by standard gas chromatography using appropriate standards for calibration. Preferably the ratios (as defined by the equation for "K", above) between olefins from about $C_6$ to about $C_{30}$ (if possible) are each measured and then averaged to obtain the SFC. If the ratios of higher olefins, such as from about $C_{20}$ to bout $C_{30}$ are too small to measure accurately, they may be omitted from the calculation of the constant. For oligomerization catalysts with higher SFCs, say >0.90, it may not be possible to accurately measure the constant from just the olefins up to about $C_{30}$ since the concentration change from olefin to olefin is relatively small and a broader range may be needed to accurately measure the SFC, i.e., higher olefins need to be measured. Such higher olefins are not very volatile and it may be advantageous to use liquid chromatography (possibly combined with mass spectroscopy to measure what is the particular olefin being eluted), again using appropriate standards for calibration.

In the Examples THF is tetrahydrofuran.

Example 1

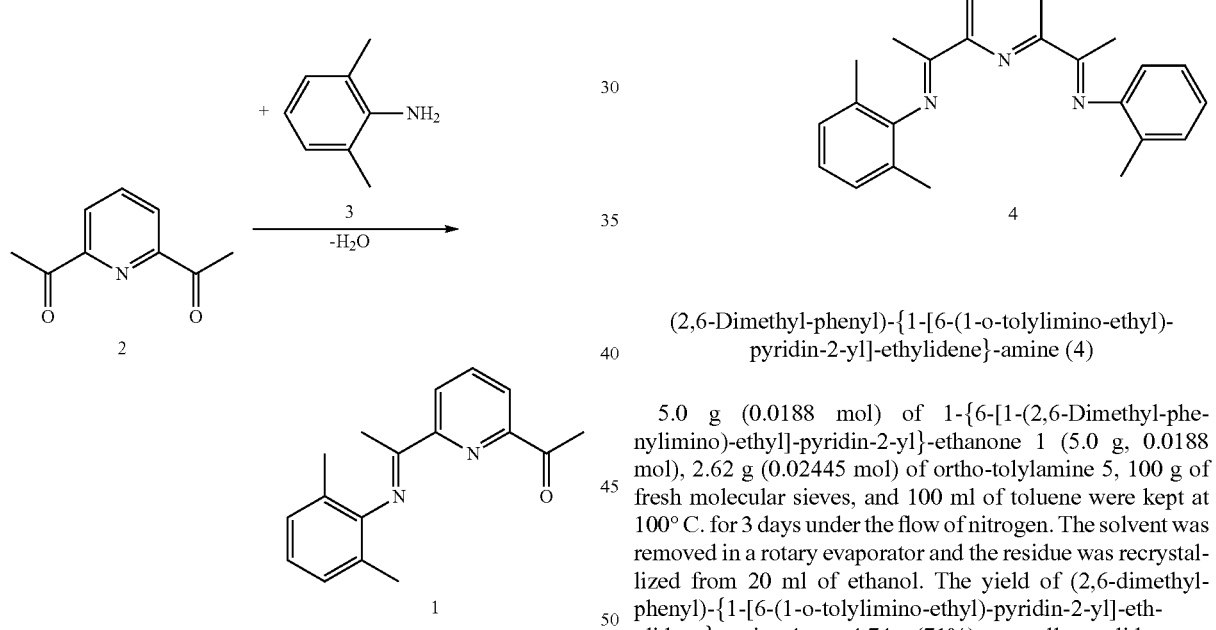

1-{6-[1-(2,6-Dimethyl-phenylimino)-ethyl]-pyridin-2-yl}-ethanone (1)

1-(6-Acetyl-pyridin-2-yl)-ethanone 2 (22.2 g, 0.0136 mole), 15.0 g (0.124 mol) of 2,6-dimethyl-phenylamine 3, 300 ml of n-propanol, and a few crystals of p-toluenesulfonic acid were stirred at room temperature for 36 h in 500 ml flask under a flow of nitrogen. The resultant yellow precipitate was filtered and washed by 20 ml of methanol. It was then dried at 1-mm vacuum overnight. The yield of 1-{6-[1-(2,6-dimethyl-phenylimino)-ethyl]-pyridin-2-yl}-ethanone 1 was 12.86 g (39%) as a yellow solid. $^1$H NMR (500 MHz, CD$_2$Cl$_2$, TMS): δ2.00 (s, 6H, Me), 2.20 (s, 3H, Me), 2.70 (s, 3H, Me), 6.90 (t, $^3J_{HH}$=8.1 Hz, 1H, Arom-H), 7.10 (d, $^3J_{HH}$=8.1 Hz, 2H, Arom-H), 7.95 (t, $^3J_{HH}$=8.0 Hz, 1H, Pyr-H), 8.10 (d, $^3J_{HH}$=8.0 Hz, 1H, Py-H), 8.55 (d, $^3J_{HH}$=8.0 Hz, 1H, Py-H). $^{13}$C NMR (500 MHz, CD$_2$Cl$_2$, TMS (selected signals)): δ167.1 (C=N), 200.1 (C=O). Anal. Calculated for C$_{17}$H$_{18}$N$_2$O (Mol. Wt.: 266.34): C, 76.66; H, 6.81; N, 10.52, Found: C, 76.69; H, 6.84; N, 10.57.

Example 2

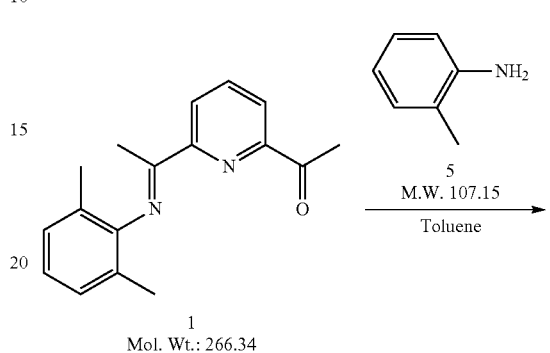

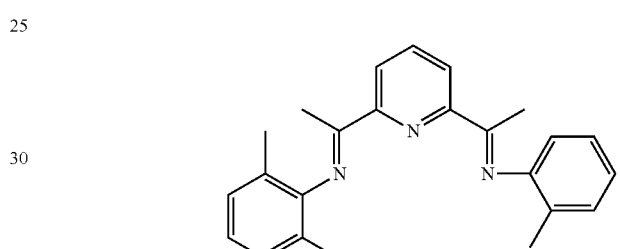

(2,6-Dimethyl-phenyl)-{1-[6-(1-o-tolylimino-ethyl)-pyridin-2-yl]-ethylidene}-amine (4)

5.0 g (0.0188 mol) of 1-{6-[1-(2,6-Dimethyl-phenylimino)-ethyl]-pyridin-2-yl}-ethanone 1 (5.0 g, 0.0188 mol), 2.62 g (0.02445 mol) of ortho-tolylamine 5, 100 g of fresh molecular sieves, and 100 ml of toluene were kept at 100° C. for 3 days under the flow of nitrogen. The solvent was removed in a rotary evaporator and the residue was recrystallized from 20 ml of ethanol. The yield of (2,6-dimethyl-phenyl)-{1-[6-(1-o-tolylimino-ethyl)-pyridin-2-yl]-ethylidene}-amine 4 was 4.74 g (71%) as a yellow solid.

Example 3

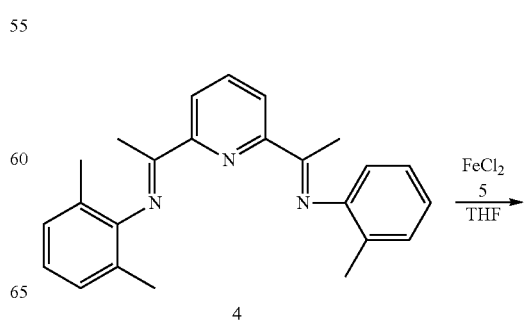

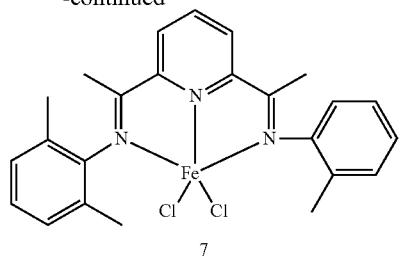

7

(2,6-Dimethyl-phenyl)-{1-[6-(1-o-tolylimino-ethyl)-pyridin-2-yl]-ethylidene}-amine iron (II) chloride (7)

(2,6-Dimethyl-phenyl)-{1-[6-(1-o-tolylimino-ethyl)-pyridin-2-yl]-ethylidene}-amine 4 (1.0 g, 0.00281 mol) was added in one portion to the suspension of 0.33 g (0.0026 mol) of iron (II) chloride in 30 ml of THF at ambient temperature in nitrogen glove box. The reaction mixture was stirred for 12 hours additionally. The resultant blue solid was filtered and washed by 50 ml of pentanes three times and dried under 1-mm vacuum overnight. The yield of (2,6-dimethyl-phenyl)-{1-[6-(1-o-tolylimino-ethyl)-pyridin-2-yl]-ethylidene}-amine iron (II) chloride 7 was 1.04 g (83%).

Example 4

The yield of (2,6-dimethyl-phenyl)-(1-{6-[1-(2-isopropyl-phenylimino)-ethyl]-pyridin-2-yl}-ethylidene)-amine 8 was 4.90 g (68%) as a yellow solid.

Example 5

(2,6-Dimethyl-phenyl)-(1-{6-[1-(2-isopropyl-phenylimino)-ethyl]-pyridin-2-yl}-ethylidene)-amine iron (II) chloride (10)

(2,6-Dimethyl-phenyl)-(1-{6-[1-(2-isopropyl-phenylimino)-ethyl]-pyridin-2-yl}-ethylidene)-amine 8 (1.0 g, 0.0026 mol) was added in one portion to the suspension of 0.31 g (0.0025 mol) of iron (II) chloride in 50 ml of THF at ambient temperature in nitrogen glove box. The reaction mixture was stirred for 12 h. The resultant blue solid was filtered and washed by 50 ml of pentanes three times and dried under 1-mm vacuum overnight. The yield of (2,6-dimethyl-phenyl)-(1-{6-[1-(2-isopropyl-phenylimino)-ethyl]-pyridin-2-yl}-ethylidene)-amine iron (II) chloride 10 was 1.06 g (85%).

Example 6

(2,6-Dimethyl-phenyl)-(1-{6-[1-(2-isopropyl-phenylimino)-ethyl]-pyridin-2-yl}-ethylidene)-amine (8)

1-{6-[1-(2,6-Dimethyl-phenylimino)-ethyl]-pyridin-2-yl}-ethanone 1 (5.0 g, 0.0188 mol), 3.30 g (0.0244 mol) of 2-isopropyl-phenylamine 9, 100 g of fresh molecular sieves, and 100 ml of toluene were kept at 100° C. for 3 days under a flow of nitrogen. The solvent was removed in a rotary evaporator and the residue was recrystallized from 20 ml of ethanol.

-continued

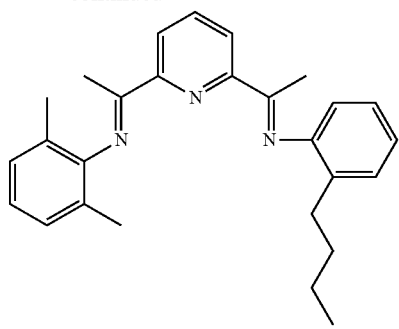

11

(1-{6-[1-(2-Butyl-phenylimino)-ethyl]-pyridin-2-yl}-ethylidene)-(2,6-dimethyl-phenyl)-amine (11)

1-{6-[1-(2,6-Dimethyl-phenylimino)-ethyl]-pyridin-2-yl}ethanone 1 (2.3 g, 0.0088 mol), 1.68 g (0.0244 mol) of 2-n-Butyl-phenylamine 12, 100 g of fresh molecular sieves, and 100 ml of toluene were kept at 100° C. for 3 days under the flow of nitrogen. The solvent was removed in a rotary evaporator and the residue was recrystallized from 5 ml of ethanol. The yield of (1-{6-[1-(2-n-butyl-phenylimino)-ethyl]-pyridin-2-yl}-ethylidene)-(2,6-dimethyl-phenyl)-amine 11 was 2.60 g (76%) as a yellow solid. $^{13}$C NMR (500 MHz, CD$_2$Cl$_2$, TMS (selected signals)): δ 166.8 (C=N), 166.1 (C=N).

Example 7

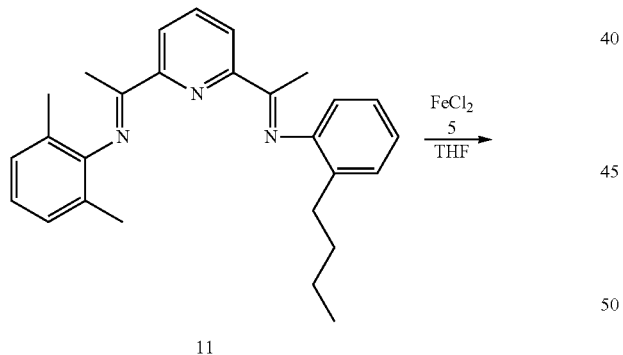

(1-{6-[1-(2-Butyl-phenylimino)-ethyl]-pyridin-2-yl}-ethylidene)-(2,6-dimethyl-phenyl)-amine iron (II) chloride (13)

1.9 g (0.0048 mol) of (1-{6-[1-(2-n-Butyl-phenylimino)-ethyl]-pyridin-2-yl}-ethylidene)-(2,6-dimethyl-phenyl)-amine 11 (1.9 g, 0.0048 mol) was added in one portion to the suspension of 0.42 g (0.0033 mol) of iron (II) chloride in 40 ml of THF at ambient temperature under nitrogen glove box. The reaction mixture was stirred for 12 h. The resultant blue solid was filtered and washed by 50 ml of pentanes three times and dried under 1-mm vacuum overnight. The yield of (1-{6-[1-(2-n-butyl-phenylimino)-ethyl]-pyridin-2-yl}-ethylidene)-(2,6-dimethyl-phenyl)-amine iron (II) chloride 13 was 1.37 g (79%).

Example 8

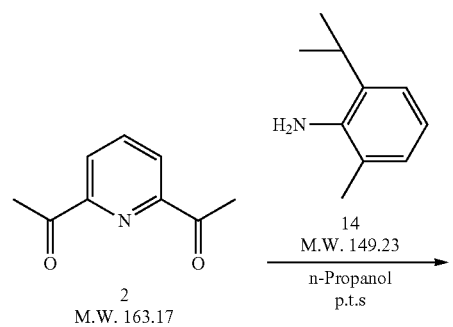

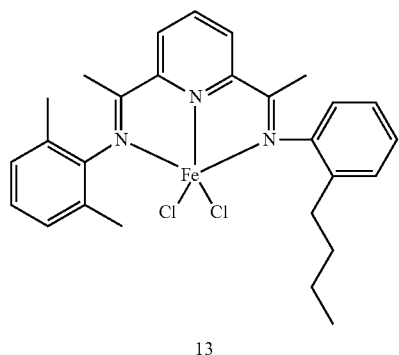

15

1-{6-[1-(2-Isopropyl-6-methyl-phenylimino)-ethyl]-pyridin-2-yl}-ethanone (15)

1-(6-Acetyl-pyridin-2-yl)-ethanone 2 (35.54 g, 0.22 mol), 25.0 g (0.168 mol) of 2-Isopropyl-6-methyl-phenylamine 14, 350 ml of n-propanol, and a few crystals of p-toluenesulfonic acid were stirred at room temperature for 36 h in a 500 ml flask under a flow of the nitrogen. The resultant yellow precipitate was filtered and washed by 20 ml of methanol. It was then dried at 1-mm vacuum overnight. The yield of 1-{6-[1-(2-Isopropyl-6-methyl-phenylimino)-ethyl]pyridin-2-yl}-ethanone 15 was 13.35 g (27%) as a yellow solid.

Example 9

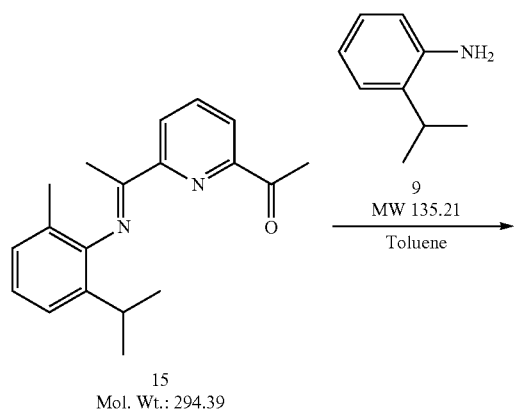

(2-Isopropyl-6-methyl-phenyl)-(1-{6-[1-(2-isopropyl-phenylimino)-ethyl]-pyridin-2-yl}-ethylidene)-amine (16)

4.0 g (0.0135 mol) of 1-{6-[1-(2-isopropyl-6-methyl-phenylimino)-ethyl]-pyridin-2-yl}-ethanone 15, 2.76 g (0.0204 mol) of 2-Isopropyl-phenylamine 9 (4.0 g, 0.0135 mol), 100 g of fresh molecular sieves, and 100 ml of toluene were kept at 100° C. for 3 days under a flow of nitrogen. The solvent was removed in a rotary evaporator and the residue was recrystallized from 10 ml of ethanol. The yield of (2-Isopropyl-6-methyl-phenyl)-(1-{6-[1-(2-isopropyl-phenylimino)-ethyl]-pyridin-2-yl}-ethylidene)-amine 16 was 4.83 g (87%) as a yellow solid. $^{13}$C NMR (500 MHz, CD$_2$Cl$_2$, TMS (selected signals)): δ 166.9 (C=N), 166.2 (C=N).

Example 10

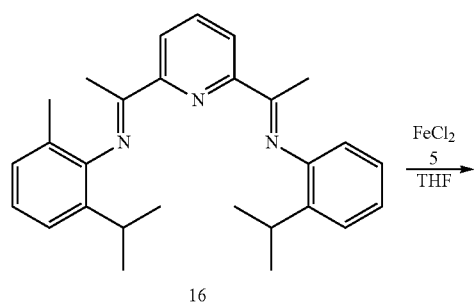

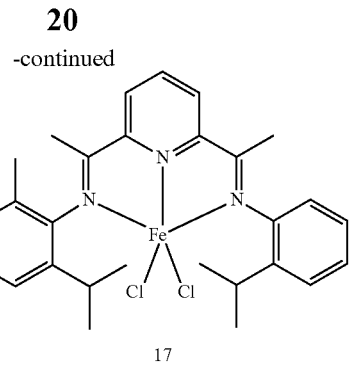

(2-Isopropyl-6-methyl-phenyl)-(1-{6-[1-(2-isopropyl-phenylimino)-ethyl]-pyridin-2-yl}-ethylidene)-amine iron (II) chloride (17)

2.42 g (0.0059 mol) of (2-Isopropyl-6-methyl-phenyl)-(1-{6-[1-(2-isopropyl-phenylimino)-ethyl]-pyridin-2-yl}-ethylidene)-amine 16 (2.42 g, 0.0059 mol) was added in one portion to the suspension of 0.71 g (0.0056 mol) of iron (II) chloride in 40 ml of THF at ambient temperature under nitrogen glove box. The reaction mixture was stirred for 12 h. The resultant blue solid was filtered and washed by 50 ml of pentanes three times and dried under 1-mm vacuum overnight. The yield of (2-isopropyl-6-methyl-phenyl)-(1-{6-[1-(2-isopropyl-phenylimino)-ethyl]-pyridin-2-yl}-ethylidene)-amine iron (II) chloride 17 was 2.29 g (76%).

Example 11

The iron complexes made in Examples 3, 5, 7 and 10 were used to oligomerize ethylene. The oligomerizations were run in a 1 l Autoclave Engineering Zipperclave® recirculating batch reactor using 700 ml of o-xylene as the solvent. The iron complexes were activated using modified methylaluminoxane 3A, and ratios of the aluminoxane to Fe (Al/Fe) are given in Table 2. In all cases there was a very large excess of the aluminoxane. After 30-60 min the oligomerization was quenched by decreasing the ethylene pressure and cooling the reactor by passing cold water through the jacket. The SFC were obtained in the standard manner by analyzing the process mixture by chromatography for α-olefins, measuring those olefins having 4 to about 30 carbon atoms, and using appropriate standards and corrections factors, calculating the amount of each olefin and then calculating the best fit SFC. Temperatures at which the oligomerizations were carried out and the resulting SFCs are given in Table 2.

TABLE 2

| Iron Complex | Temp, ° C. | Al/Fe | SFC |
|---|---|---|---|
| 7 | 85 | 10,740 | 0.86 |
| 10 | 120 | 2,880 | 0.82 |
|  | 100 | 7,190 | 0.80 |
| 13 | 85 | 37,100 | — |
| 17 | 85 | 24,640 | 0.85 |

It is believed the SFC for 13 was fairly high since only relatively very small amounts of lower α-olefins were believed present.

The present invention is not limited to the embodiments described and exemplified above, but is capable of variation and modification without departure from the scope of the appended claims.

What is claimed is:

1. A process for the manufacture of a branched polyethylene, comprising,
   (1) contacting ethylene with an ethylene oligomerization catalyst which produces a series of α-olefins; and then
   (2) after said series of α-olefins is formed contacting in a liquid medium said series of α-olefins with a copolymerization catalyst and ethylene to form a branched polyethylene;

and wherein said oligomerization catalyst which produces said series of α-olefins has a Schulz-Flory constant of about 0.80 to 0.995 under oligomerization process conditions, and wherein the branched polyethylene produced has a density of 0.930 or more.

2. The process as described in claim 1 wherein said Schulz-Flory constant is about 0.80 to about 0.98.

3. The process as described in claim 1 wherein said Schulz-Flory constant is about 0.85 to 0.95.

4. The process as described in claim 1 wherein said oligomerization catalyst is an iron complex of a ligand of the formula

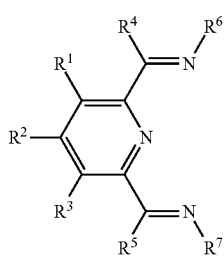

(I)

wherein: $R^1$, $R^2$ and $R^3$ are each independently hydrogen, hydrocarbyl, substituted hydrocarbyl or an inert functional group, provided that any two of $R^1$, $R^2$ and $R^3$ vicinal to one another taken together may form a ring; $R^4$ and $R^5$ are each independently hydrogen, hydrocarbyl, substituted hydrocarbyl or an inert functional group provided that $R^1$ and $R^4$ and/or $R^3$ and $R^5$ taken together may form a ring; and $R^6$ and $R^7$ are each independently substituted aryl.

5. The process as described in claim 1 wherein step (2) is a solution polymerization.

6. The process as described in claim 1 wherein step (2) is a slurry polymerization.

7. The process as recited in claim 6 wherein said oligomerization catalyst and said copolymerization catalyst are both on the same support particles.

8. The process as recited in claim 4 wherein $R^6$ is (II) and $R^7$ is (III),

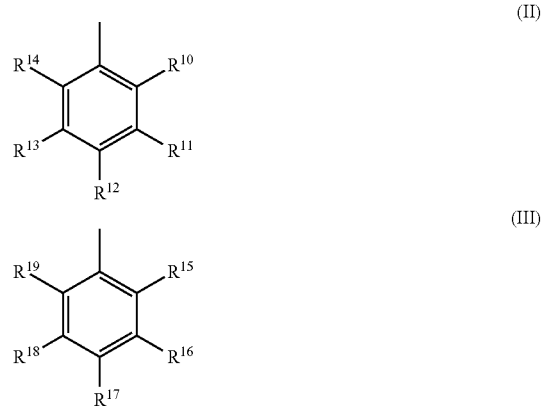

wherein:
$R^{10}$, $R^{14}$, and $R^{15}$ are each independently hydrocarbyl, substituted hydrocarbyl or a functional group other than fluoro; and
$R^{11}$ to $R^{13}$ and $R^{16}$ to $R^{18}$ are each independently hydrogen hydrocarbyl, substituted hydrocarbyl or a functional group, and $R^{19}$ is hydrogen or fluoro, and/or any two of $R^{10}$ through $R^{19}$ vicinal to one another may form a ring.

9. The process as recited in claim 8 wherein:
$R^{10}$, $R^{14}$ and $R^{15}$ are each independently alkyl containing 1 to 12 carbon atoms, and/or;
$R^{11}$ through $R^{13}$ and $R^{16}$ through $R^{18}$ are each independently hydrogen or alkyl containing 1 to 12 carbon atoms;
and/or $R^1$, $R^2$, and $R^3$ are hydrogen;
and/or $R^4$ and $R^5$ are both methyl or both hydrogen.

10. The process as recited in claim 1 wherein said copolymerization catalyst is a Ziegler-Natta catalyst, chromium, or a metallocene catalyst.

11. The process as recited in claim 1 wherein step (2) also comprises one or more added α-olefins and/or one or more additional ethylene oligomerization catalysts having a Schulz-Flory constant of 0.70 or less.

12. The process as recited in claim 1 wherein an ethylene polymerization catalyst which does not readily copolymerize α-olefins is also present.

* * * * *